(12) United States Patent
Kent et al.

(10) Patent No.: US 7,983,322 B2
(45) Date of Patent: *Jul. 19, 2011

(54) METHOD AND SYSTEM FOR CODEBOOK DESIGN OF MIMO PRE-CODERS WITH FINITE RATE CHANNEL STATE INFORMATION FEEDBACK

(75) Inventors: Mark Kent, Vista, CA (US); Vinko Erceg, Cardiff, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 11/767,071

(22) Filed: Jun. 22, 2007

(65) Prior Publication Data

US 2008/0165868 A1 Jul. 10, 2008

Related U.S. Application Data

(60) Provisional application No. 60/884,113, filed on Jan. 9, 2007.

(51) Int. Cl.
*H04L 27/30* (2006.01)
(52) U.S. Cl. .......................... 375/146; 375/267; 375/299
(58) Field of Classification Search .................. 375/141, 375/144, 146–148, 220, 221, 267, 285, 295, 375/299, 340, 347, 349
See application file for complete search history.

(56) References Cited

U.S. PATENT DOCUMENTS

| | | | |
|---|---|---|---|
| 7,676,007 B1 * | 3/2010 | Choi et al. ...................... 375/347 |
| 2006/0203708 A1 * | 9/2006 | Sampath et al. .............. 370/208 |
| 2007/0174038 A1 * | 7/2007 | Wang et al. ........................ 704/1 |
| 2008/0080449 A1 * | 4/2008 | Huang et al. ................... 370/342 |
| 2008/0108310 A1 * | 5/2008 | Tong et al. ....................... 455/69 |
| 2008/0112504 A1 * | 5/2008 | Jiang et al. ..................... 375/296 |
| 2008/0159425 A1 * | 7/2008 | Khojastepour et al. ........ 375/260 |
| 2008/0165044 A1 * | 7/2008 | Kent et al. ...................... 341/174 |
| 2008/0165869 A1 * | 7/2008 | Kent et al. ...................... 375/260 |
| 2008/0192717 A1 * | 8/2008 | Kent et al. ...................... 370/342 |
| 2008/0268785 A1 * | 10/2008 | McCoy et al. ............. 455/67.11 |
| 2008/0304464 A1 * | 12/2008 | Borkar et al. ................. 370/342 |
| 2009/0323851 A1 * | 12/2009 | Ling et al. ..................... 375/267 |

* cited by examiner

*Primary Examiner* — Dac V Ha
(74) *Attorney, Agent, or Firm* — McAndrews, Held & Malloy, Ltd.

(57) ABSTRACT

Aspects of a method and system for codebook design of MIMO pre-coders with finite rate channel state information feedback may include quantizing channel state information in a MIMO pre-coding system onto a codebook, which include unitary matrices, using a cost function. The codebook may be iteratively updated based on at least the channel state information. The channel state information may comprise a matrix V. The cost function f(A) is defined by the following relationship:

$$f(A) = \left( \frac{1}{N} \sum_{j=1}^{N} |a_{jj}|^2 \right)$$

where A is a matrix of size N by N and $a_{ij}$ is element (i,j) of matrix A. Voronoi regions may be generated from the codebook for the unitary matrices. A set of matrices based on the Voronoi regions and the unitary matrices may be generated. Updating the codebook may be achieved by modifying the set of matrices into a new set of unitary matrices, where the new set of unitary matrices become the codebook.

22 Claims, 7 Drawing Sheets

METHOD AND SYSTEM FOR CODEBOOK DESIGN OF MIMO PRE-CODERS WITH FINITE RATE CHANNEL STATE INFORMATION FEEDBACK

CROSS-REFERENCE TO RELATED APPLICATIONS/INCORPORATION BY REFERENCE

This application makes reference to, claims priority to, and claims the benefit of U.S. Provisional Application Ser. No. 60/884,113, filed on Jan. 9, 2007.

This application makes reference to:
U.S. Application Ser. No. 60/884,118, filed on Jan. 9, 2007;
U.S. Application Ser. No. 60/884,133, filed on Jan. 9, 2007;
U.S. Application Ser. No. 60/884,132, filed on Jan. 9, 2007;
U.S. application Ser. No. 11/767,108, filed on even date herewith;
U.S. application Ser. No. 11/767,123, filed on even date herewith; and
U.S. application Ser. No. 11/767,158, filed on even date herewith;

Each of the above referenced applications is hereby incorporated herein by reference in its entirety.

FIELD OF THE INVENTION

Certain embodiments of the invention relate to signal processing for communication systems. More specifically, certain embodiments of the invention relate to a method and system for codebook design of MIMO pre-coders with finite rate channel state information feedback.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some work on multiple antenna systems may be focused on systems that support single user point-to-point links, other work may focus on multiuser scenarios. Communication systems that employ multiple antennas may greatly improve the system capacity. To obtain significant performance gains using MIMO technology, it may however be desirable to supply information on the channel to the transmitter. Such channel data is called channel state information (CSI). In many wireless systems, the uplink and the downlink operate in frequency division duplex (FDD) mode, that is, the uplink and the downlink use different frequencies. When this is the case, channel measurements of the uplink may not be applicable to the downlink and vice versa. In these instances, the channel may be measured only by a signal receiver and channel state information may be fed back to the transmitter. In the case of a large number of antennas, feeding back channel state information on the uplink channel may involve data transfers of large amounts of data. Since bandwidth on the uplink channel may be limited, it may be undesirable to transfer large amounts of channel information data on the uplink channel.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for codebook design of MIMO pre-coders with finite rate channel state information feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for codebook design of MIMO pre-coders with finite rate channel state information feedback. Aspects of the method and system for codebook design of MIMO pre-coders with finite rate channel state information feedback may comprise, quantizing channel state information in a MIMO pre-coding system onto a codebook, which comprises one or more unitary matrices, using a cost function; and iteratively updating the codebook based on at least the channel state information. The channel state information may comprise a matrix V and the cost function f(A) may be defined by the following relationship:

$$f(A) = \left( \frac{1}{N} \sum_{j=1}^{N} |a_{jj}|^2 \right)$$

where A is a matrix of size N by N and $a_{ij}$ is element (i,j) of matrix A. Voronoi regions may be generated from the codebook for the unitary matrices. A set of matrices based on the Voronoi regions and the unitary matrices may be generated. Updating the codebook may be achieved by modifying the set of matrices into a new set of unitary matrices, where the new set of unitary matrices become the codebook. An index of an element of the codebook onto which the channel state information is quantized may be transmitted from a receiver to a transmitter in the MIMO pre-coding system. The MIMO pre-coding system may comprise one or more transmit and receive antennas. The matrix V may be generated using Singular Value Decomposition (SVD) or Geometric Mean Decomposition (GMD). One of the unitary matrices may be used to linearly transform a vector signal at a transmitter of the MIMO pre-coding system.

Figure 1A:
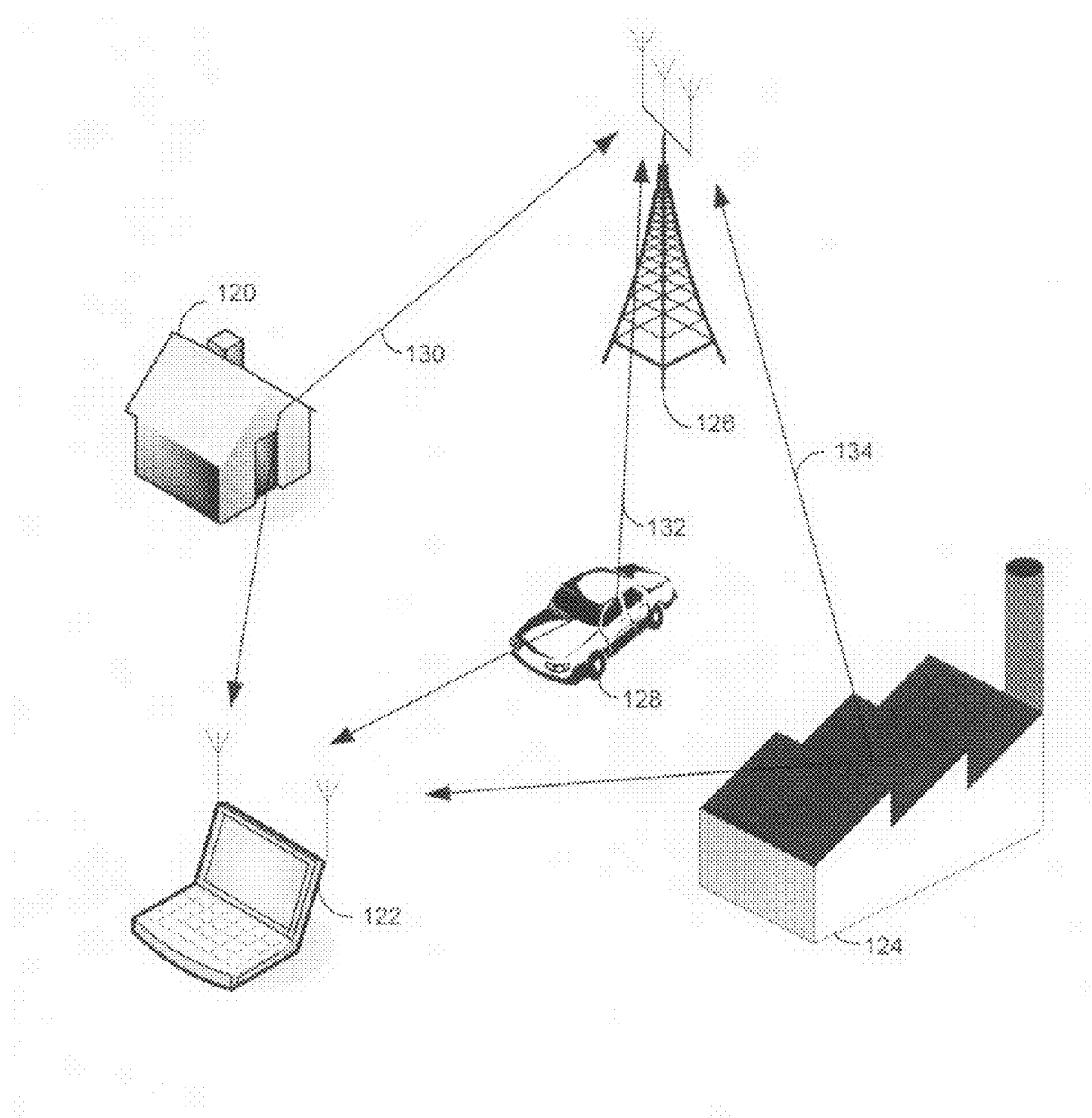
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals.

Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
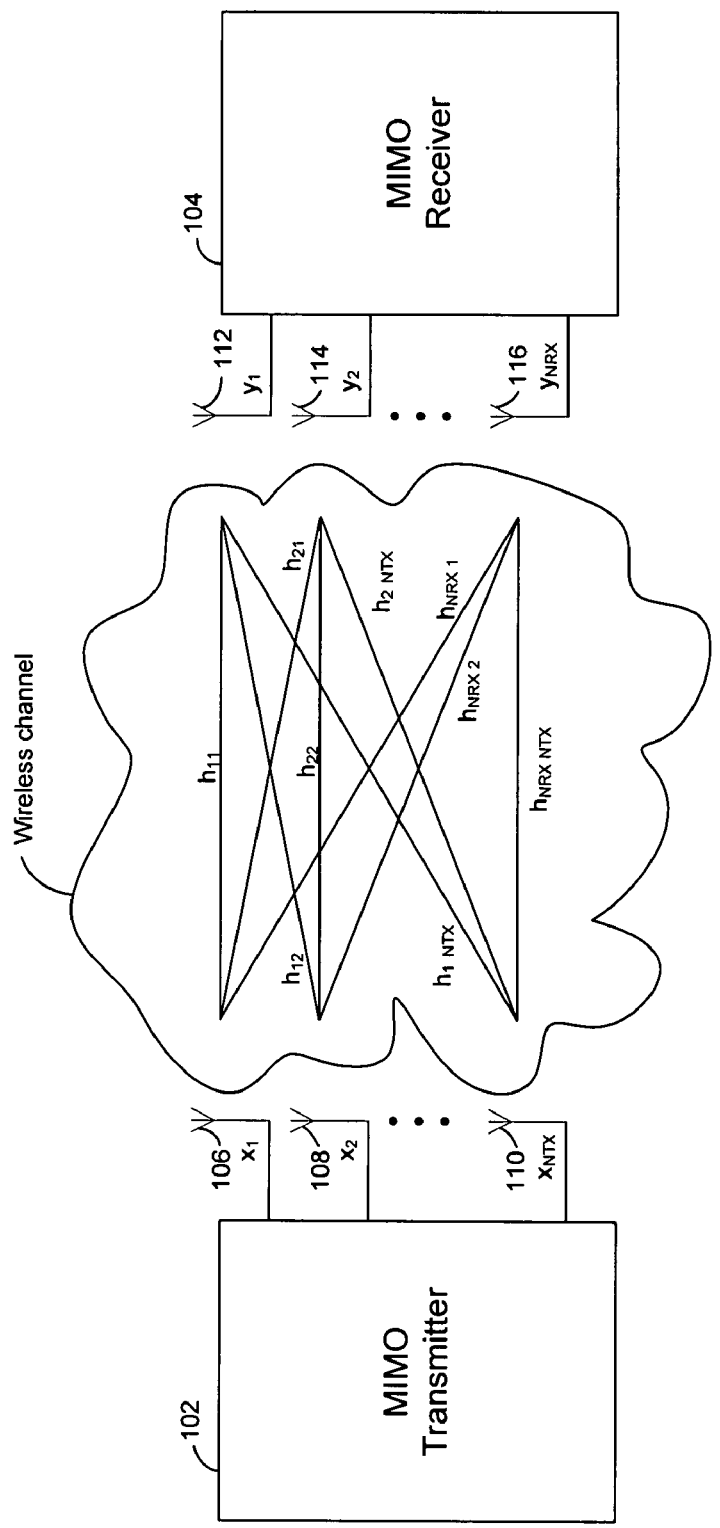
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising communication paths $h_{11}$, $h_{12}$, $h_{22}$, $h_{21}$, $h_{2\_NTX}$, $h_{1\_NTX}$, $h_{NRX\_1}$, $h_{NRX\_2}$, $h_{NRX\_NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$, $i \in \{1,2,\ldots N_{TX}\}$ that may be transmitted by the transmit antennas, of which the antennas 106, 108 and 110 may be depicted in FIG. 1B. The MIMO receiver 104 may comprise suitable logic, circuitry and/or code that may be enabled to process the receive symbols $y_i$, $i \in \{1,2,\ldots N_{RX}\}$ that may be received by the receive antennas, of which the antennas 112, 114 and 116 may be shown in FIG. 1B. An input-output relationship between the transmitted and the received signal in a MIMO system may be written as:

$$y = Hx + n$$

where $y = [y_1, y_2, \ldots y_{NRX}]^T$ may be a column vector with $N_{RX}$ elements, $.^T$ may denote a vector transpose, $H = [h_{ij}]$; $i \in \{1,2,\ldots N_{RX}\}$; $j \in \{1,2,\ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements. The channel matrix H may be written, for example, as $H = U\Sigma V^H$ using the Singular Value Decomposition (SVD), where $.^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H = QRP^H$, where R may be upper triangular with the geometric mean of the singular values of H on the diagonal elements, and Q and P may be unitary.

Figure 2:
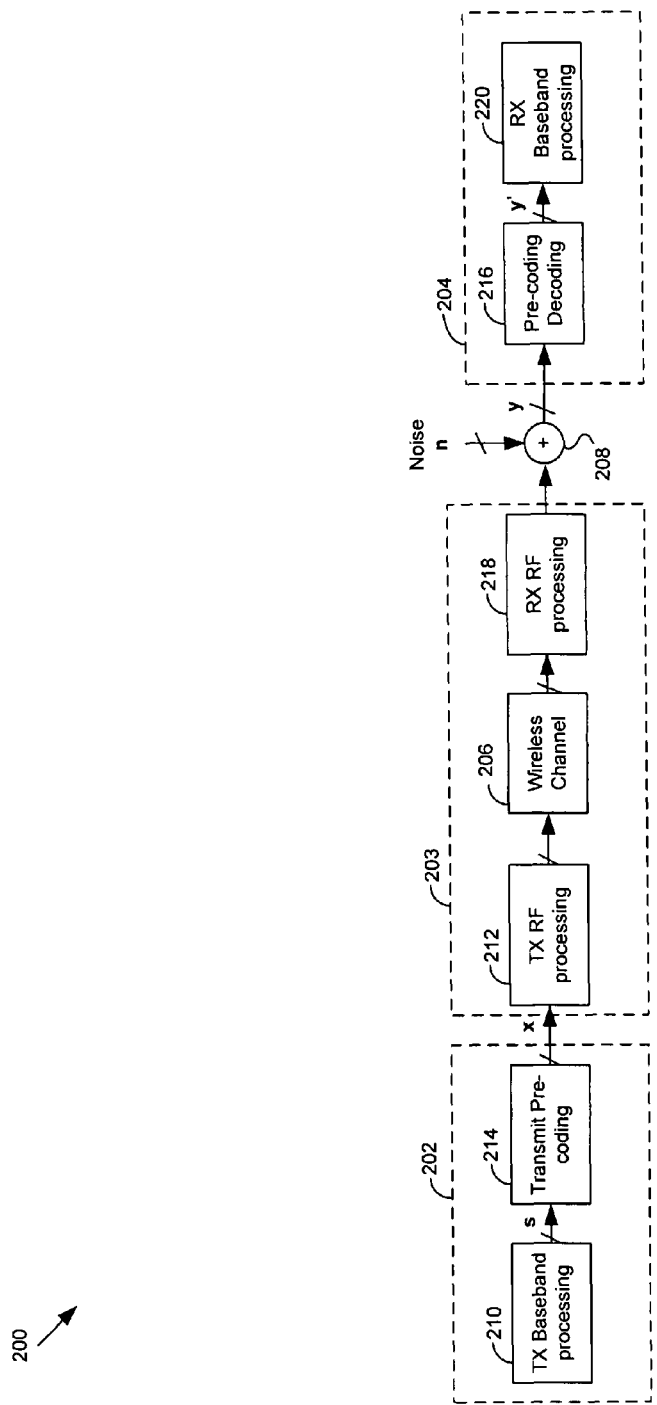
FIG. 2 is a block diagram illustrating an exemplary MIMO pre-coding transceiver chain model, in accordance with an embodiment of the invention.

FIG. 2 is a block diagram illustrating an exemplary MIMO pre-coding transceiver chain model, in accordance with an embodiment of the invention. Referring to FIG. 2, there is shown a MIMO pre-coding system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RF) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that $x = Ws$, where W may be of dimension $N_{TX}$ by length of s, and $x = [x_1, x_2, \ldots x_{NTX}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by $y = Hx + n = HWs + n$. The received vector y may be communicated to the pre-coding decoding block 216, where a linear decoding operation B may be applied to the received vector y to obtain the decoded vector $y' = B^H y = B^H HWs + B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting $W = V$ and $B = U$, where $H = U\Sigma V^H$ may be the singular value decomposition. In these instances, the channel decoded vector y' may be given by the following relationship:

$$y' = U^H U\Sigma V^H Vs + U^H n = \Sigma s + U^H n$$

Since $\Sigma$ may be a diagonal matrix, there may be no interference between the elements of symbol vector s in y' and hence the wireless communications system may appear like a system with up to $N_{TX}$ parallel single antenna wireless communication systems, for each element of s, up to the rank of channel matrix H which may be less or equal to $N_{TX}$.

Figure 3:
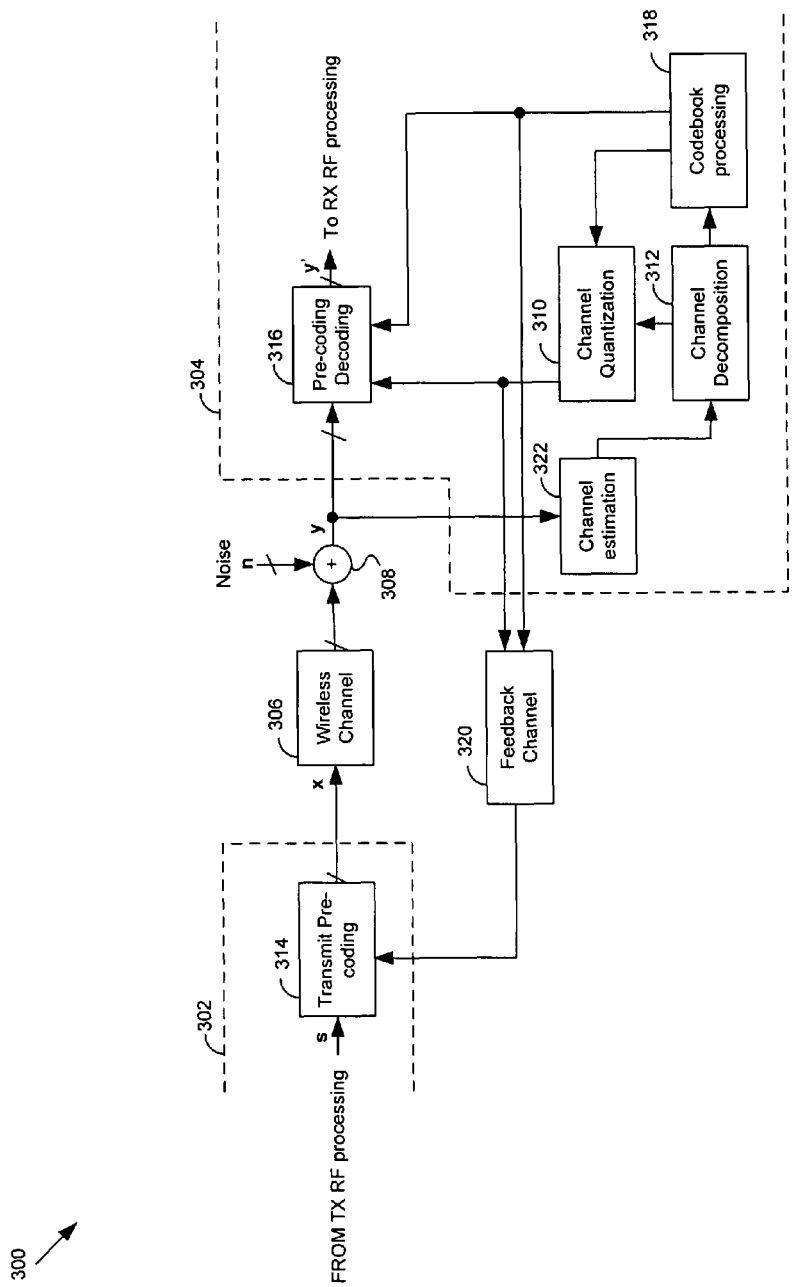
FIG. 3 is a block diagram of an exemplary MIMO pre-coding system with finite rate channel state information feedback, in accordance with an embodiment of the invention.

FIG. 3 is a block diagram of an exemplary MIMO pre-coding system with finite rate channel state information feedback, in accordance with an embodiment of the invention. Referring to FIG. 3, there is shown a MIMO pre-coding system 300, comprising a partial MIMO transmitter 302, a partial MIMO receiver 304, a Wireless channel 306, an adder 308, and a feedback channel 320. The partial MIMO transmitter 302 may comprise a transmit pre-coding block 314. The partial MIMO receiver 304 may comprise a pre-coding decoding block 316, a channel estimation block 322, a channel quantization block 310, a channel decomposition block 312, and a codebook processing block 318. There is also shown a symbol vector s, a pre-coded vector x, a noise vector n, a received vector y, and a decoded vector y'.

The transmit pre-coding block 314, the wireless channel 306, the adder 308 and the pre-coding decoding block 316 may be substantially similar to the transmit pre-coding block 214, the MIMO baseband equivalent channel 203, the adder 208 and the pre-coding decoding block 216, illustrated in FIG. 2. The channel estimation block 322 may comprise suitable logic, circuitry and/or logic to estimate the transfer function of the wireless channel 206. The channel estimate may be communicated to the channel decomposition block 312, which may comprise suitable logic, circuitry and/or code, which may be enabled to decompose the channel. In this regard, the decomposed channel may be communicated to the channel quantization block 310. The channel quantization block 310 may comprise suitable logic, circuitry and/or code, which may be enabled to partly quantize the channel onto a codebook. The codebook processing block 318 may comprise suitable logic, circuitry and/or logic, which may be enabled to generate a codebook. The feedback channel 320 may represent a channel that may be enabled to carry channel state information from the partial MIMO receiver 304 to the partial MIMO transmitter 302.

In many wireless systems, the channel state information, that is, knowledge of the channel transfer matrix H, may not be available at the transmitter and the receiver. However, in order to utilize a pre-coding system as illustrated in FIG. 2, it may be desirable to have at least partial channel knowledge available at the transmitter. In the exemplary embodiment of the invention disclosed in FIG. 2, the MIMO transmitter 302 may require the unitary matrix V for pre-coding in the transmit pre-coding block 214 of MIMO transmitter 202.

In frequency division duplex (FDD) systems, the frequency band for communications from the base station to the mobile terminal, downlink communications, may be different from the frequency band in the reverse direction, uplink communications. Because of a difference in frequency bands, a channel measurement in the uplink may not generally be useful for the downlink and vice versa. In these instances, the measurements may only be made at the receiver and channel state information (CSI) may be communicated back to the transmitter via feedback. For this reason, the CSI may be fed back to the transmit pre-coding block 314 of the partial MIMO transmitter 302 from the partial MIMO receiver 304 via the feedback channel 320. The transmit pre-coding block 314, the wireless channel 306, and the adder 308 are substantially similar to the corresponding blocks 214, 203 and 208, illustrated in FIG. 2.

At the partial MIMO receiver 304, the received signal y may be used to estimate the channel transfer function H by Ĥ in the channel estimation block 322. The estimate may further be decomposed into, for example, a diagonal or triangular form, depending on a particular receiver implementation, as explained for FIG. 2. For example, the channel decomposition block 312 may perform an SVD: $\hat{H} = \hat{U}\hat{\Sigma}\hat{V}^H$. In the case of a plurality of antennas, the dimensions of the matrices U, Σ and V may grow quickly. In these instances, it may be desirable to quantize the matrix $\hat{V}$ into a matrix $V_q$ of dimensions $N_{TX}$ by $N_{TX}$, where $V_q$ may be chosen from pre-defined finite set of unitary matrices $C=\{V_i\}$. The set of unitary matrices C may be referred to as the codebook. By finding a matrix $V_q$ from the codebook that may be, in some sense, closest to the matrix $\hat{V}$, it may suffice to transmit the index q to the transmit pre-coding block 314 via the feedback channel 320 from the channel quantization block 310, if the partial MIMO transmitter 302 may know the codebook C. The codebook C may be varying much slower than the channel transfer function H and it may suffice to periodically update the codebook C in the transmit pre-coding block 314 from the codebook processing block 318 via the feedback channel 320. The codebook C may be chosen to be static or adaptive. Furthermore, the codebook C may also be chosen, adaptively or non-adaptively, from a set of codebooks, which may comprise adaptively and/or statically designed codebooks. In these instances, the partial MIMO receiver 304 may inform the partial MIMO transmitter 302 of the codebook in use at any given instant in time. The matrix $\hat{V}$ may be quantized into $V_q$ as described by the following relationships:

$$V_q = \text{argmax}_{\hat{V}_i \in C} f(\hat{V}^H \hat{V}_i)$$

$$f(A) = \left(\frac{1}{N}\sum_{j=1}^{N} |a_{jj}|^2\right)$$

where $A=[a_{ij}]$ and A may be of dimensions N by N. Hence, the matrix $V_q$ may be chosen as the matrix $\hat{V}_i$ in the codebook C that may maximize the function $f(\hat{V}^H \hat{V}_i)$ as defined above. The function f(.) may average the squared absolute value of the diagonal elements of its input matrix. By maximizing f(.), the matrix $V_q$ is chosen so that the product $\hat{V}^H \hat{V}_i$ may be most like an identity matrix, in some sense. The expression for f(.) above may maximize the instantaneous capacity of the pre-coded MIMO system under some approximations. Hence, the channel H may be estimated in the channel estimation block 322 and decomposed in the channel decomposition block 312.

In the channel quantization block 310, a matrix, for example $\hat{V}$ may be quantized into a matrix $V_q$ and the index q may be fed back to the partial MIMO transmitter 302 via the feedback channel 320. The codebook C may also be chosen time invariant. Furthermore, the codebook C may also be chosen, adaptively or non-adaptively, from a set of codebooks, which may comprise adaptively and/or statically designed codebooks. Less frequently than the index q, the codebook C from the codebook processing block 318 may be transmitted to the partial MIMO transmitter 302 via the feedback channel 320. To feedback the index q, M bits may suffice when the cardinality |C| of the codebook C may be less or equal to $|C| \leq 2^M$.

The transmit pre-coding block 314 may perform, for example, the linear transformation $x=V_q s$. The pre-coding decoding block 316 at the receiver may implement the linear transformation $y'=\hat{U}^H y$. In some instances, the rank r of the channel matrix H may be less than the number of transmit antennas $r \leq N_{TX}$. In these instances, it may be desirable to map a reduced number of spatial streams into the vector x, as described for FIG. 2. For example, the vector s may be chosen, so that $x=Ws$, where W may be of dimension $N_{TX}$ by the length of s and the length of s may be the number of spatial streams, generally smaller than the rank r. The matrix W may be constructed, for example, from a desirable choice of columns from $V_q$. In another embodiment of the invention, the vector x may be generated from $x=V_q s$, as described above, and some suitably chosen elements of the vector s of length $N_{TX}$ may be set to zero, so that generally the non-zero elements in the vector s may be less than the rank r. In these instances, the elements in s that may be set to zero may correspond to non-utilized spatial streams.

Figure 4:
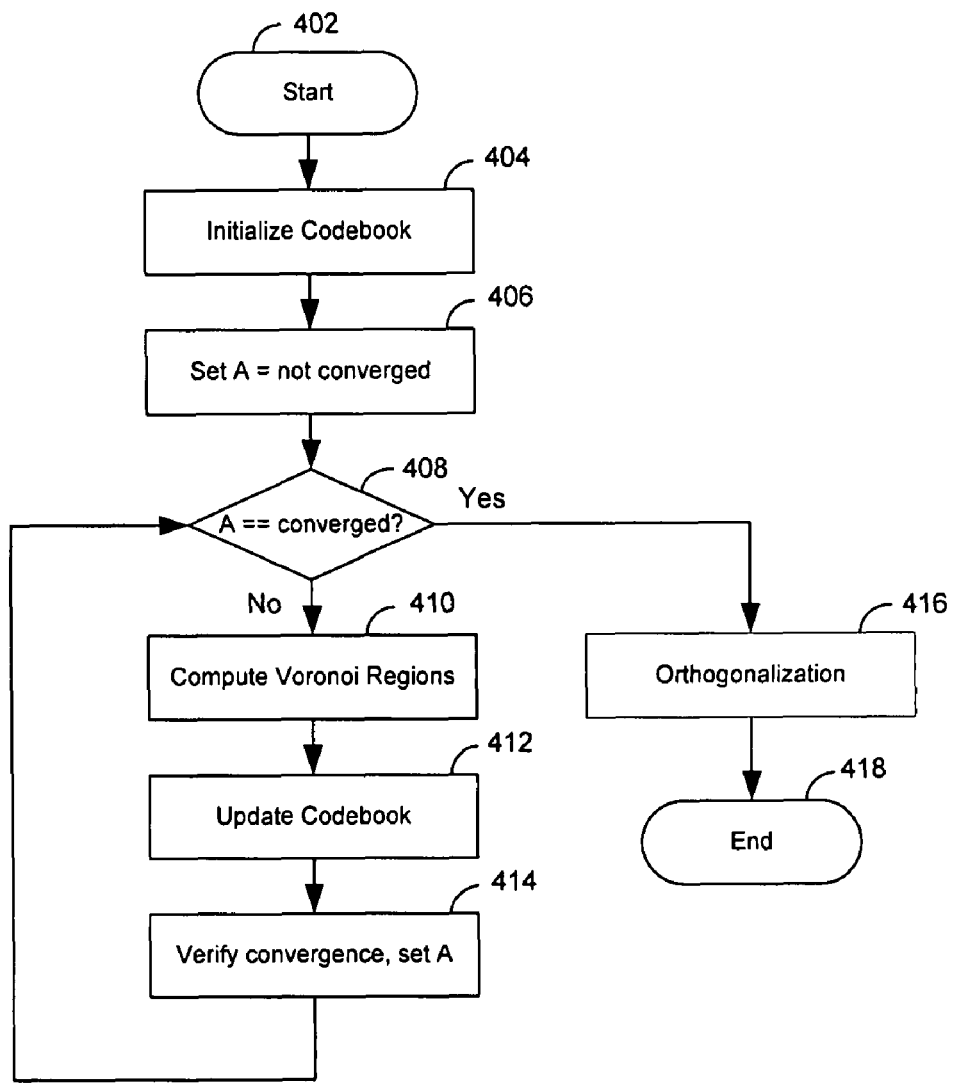
FIG. 4 is a flow chart illustrating an exemplary implementation of a codebook algorithm, in accordance with an embodiment of the invention.

FIG. 4 is a flow chart illustrating an exemplary implementation of a codebook algorithm, in accordance with an embodiment of the invention. Referring to FIG. 4, there is shown a start step 402, an end step 418, process steps 404, 406, 410, 412, 414 and 416, and a decision step 408.

The choice of codebook C may be important to determine the performance of the feedback system explained in FIG. 3. The flow chart in FIG. 4 may provide an exemplary means of implementing a codebook algorithm that may be suitable for any quantization resolution, that is number of matrices $V_i$ in the codebook $C=\{V_i\}$, and any number of receive and transmit antennas. Notwithstanding, a codebook may be designed that may maximize the following relationship:

$$C = \max_C E_H\{f(\hat{V}^H V_q)\}$$

where $E_H\{.\}$ may be expectation over the ensemble of the channel realizations H. The above relationship may indicate that the best choice of codebook, in some instances, may be the codebook C comprising the matrices $V_q$, such that the expectation with respect to channel H of the function f(.) may be maximized. This may be achieved with the algorithm in FIG. 4.

In step 404, the codebook may be initialized. The codebook $C=\{V_i\}$ may, for example, be constructed from random matrices $V_i$. The initial choice of matrices $V_i$ may be immaterial. In step 406, a variable A may be initialized to a value 'not converged'. While A may not be set to a value 'converged' in decision step 208, the algorithm may compute the Voronoi Regions from the codebook C in step 410. In step 410, the multidimensional space that may be spanned by the codebook C may be partitioned into cells $R_i$, referred to as Voronoi regions, such that each cell $R_i$ represents a sub-space that may be closest, in some sense, to a particular matrix $V_i$, as illustrated in the following relationship:

$$R_i = \{\hat{V}: f(\hat{V}^H V_i) \geq f(\hat{V}^H V_j), \forall j \neq i\}$$

In step 412, the codebook C may be updated, based on the Voronoi regions that may be computed in step 410. For any given region Ri, a new matrix $V_i = [v_{i,1}, v_{i,2}, \ldots v_{i,NTX}]$ may be generated, where $v_{i,k}$ may be a column vector of length $N_{TX}$, as shown in the following relationship:

$$v_{i,k} = \arg\max_{q: \|q\|=1} E_V\{|v_k^H q|^2 | V \in R_i\}$$

where $v_k$ may be the k-th column of a matrix V. A solution to the above optimization problem may be given by the following relationships:

$$v_{i,k} = u_{MAX}$$

$$\lambda_{MAX} \cdot u_{MAX} = R_{kk} u_{MAX}$$

$$R_{kk} = E\{v_k v_k^H | V \in R_i\}$$

where $v_{i,k}$ may be chosen as the eigenvector $u_{MAX}$ corresponding to the maximum eigenvalue $\lambda_{MAX}$ of the matrix $R_{kk}$. For the above equations, the expectations $E_Z\{.\}$ with respect to some variable Z, may be computed by sample averages of the sample space.

In step 414, a test for convergence may be applied to the codebook C to verify whether the codebook may have converged to a stable set. For example, a convergence test may measure by how much each matrix $V_q$ may have changed between successive steps 412. If the change is less than a threshold value, convergence may be assumed to have been reached. In step 414, if the codebook has converged, the variable A may be set to value 'converged', otherwise the variable A may be set to value 'not converged'.

If, in step 414, the variable A may have been set to 'converged', the loop comprising the steps 410, 412 and 414 may be exited and the resulting codebook C may be orthogonalized in process step 416. It may be desirable for the matrices $\{V_i\}$ to be orthonormal, that is:

$$V_i^H V_j = I \forall i = j$$

where I may be an identity matrix and 0 may be matrix of all-zero elements. The obtained codebook $C=\{V_i\}$ may be orthogonalized by applying, for example, a Gram-Schmidt orthogonalization to the matrices $\{V_i\}$. Orthogonalization of the codebook C may terminate the codebook generation in end step 418.

Figure 5:
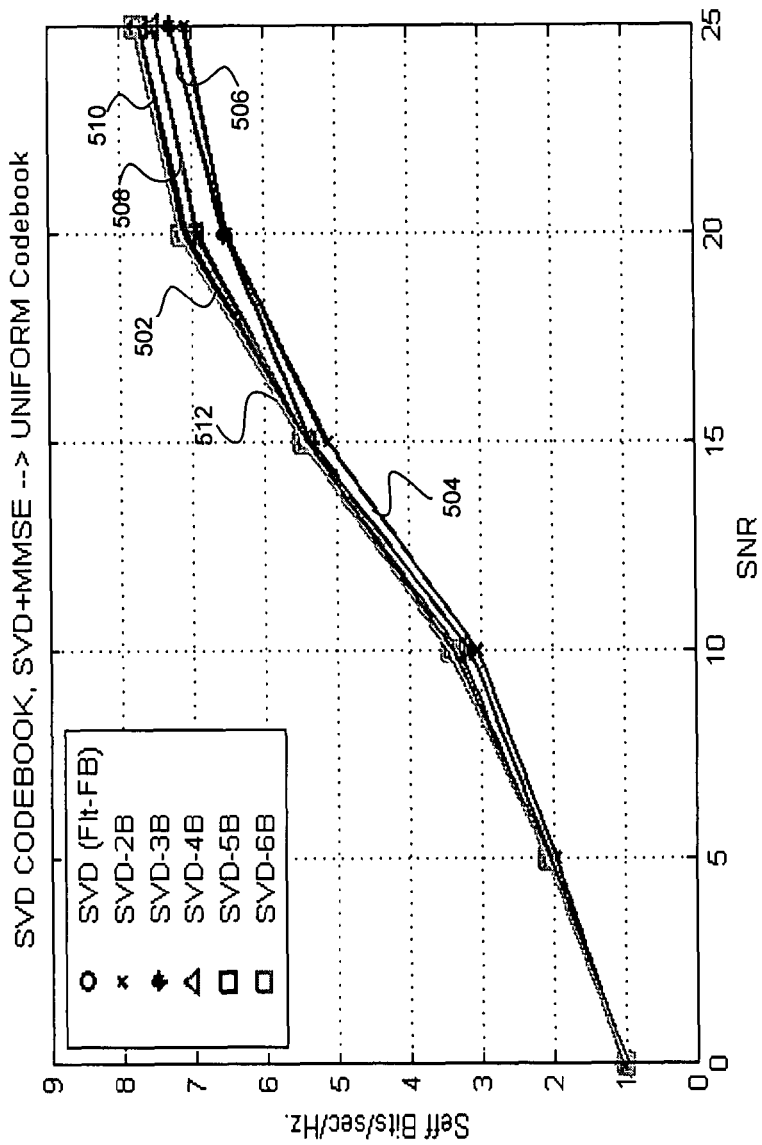
FIG. 5 is a performance plot of an exemplary 2×2 MIMO system with an MMSE receiver and finite-rate feedback, in accordance with an embodiment of the invention.

FIG. 5 is a performance plot of an exemplary 2×2 MIMO system with an MMSE receiver and finite-rate feedback, in accordance with an embodiment of the invention. Referring to FIG. 5, there is shown an SNR axis and a spectral efficiency axis (Seff). There is further shown a line plot for a Singular Value Decomposition with Full feedback SVD (Flt-FB) 502, a line plot for a SVD with 2 bits of feedback (SVD-2B) 504, a line plot for SVD-3B 506, a line plot for SVD-4B 508, a line plot for SVD-5B 510, and a line plot for SVD-6B 512.

As explained with respect to FIG. 3, the number of bits available for feedback may determine how finely the unitary matrix $\hat{V}$ may be quantized. For M bits, the codebook C may comprise $|C| \leq 2^M$ elements $\{V_i\}$. Therefore, a larger number of feedback bits may allow better quantization of the channel and may offer better performance. It may be seen in FIG. 5 that even few bits of feedback using an exemplary embodiment of the invention may offer performance that may be close to full feedback, SVD (Flt-FB) 502. The line plots SVD-2B 504, SVD-3B 506, SVD-4B 508, SVD-5B 510 and SVD-6B 512 may be close to SVD (Flt-FB) 502. A Minimum Mean Square Error (MMSE) receiver may be enabled in FIG. 5.

Figure 6:
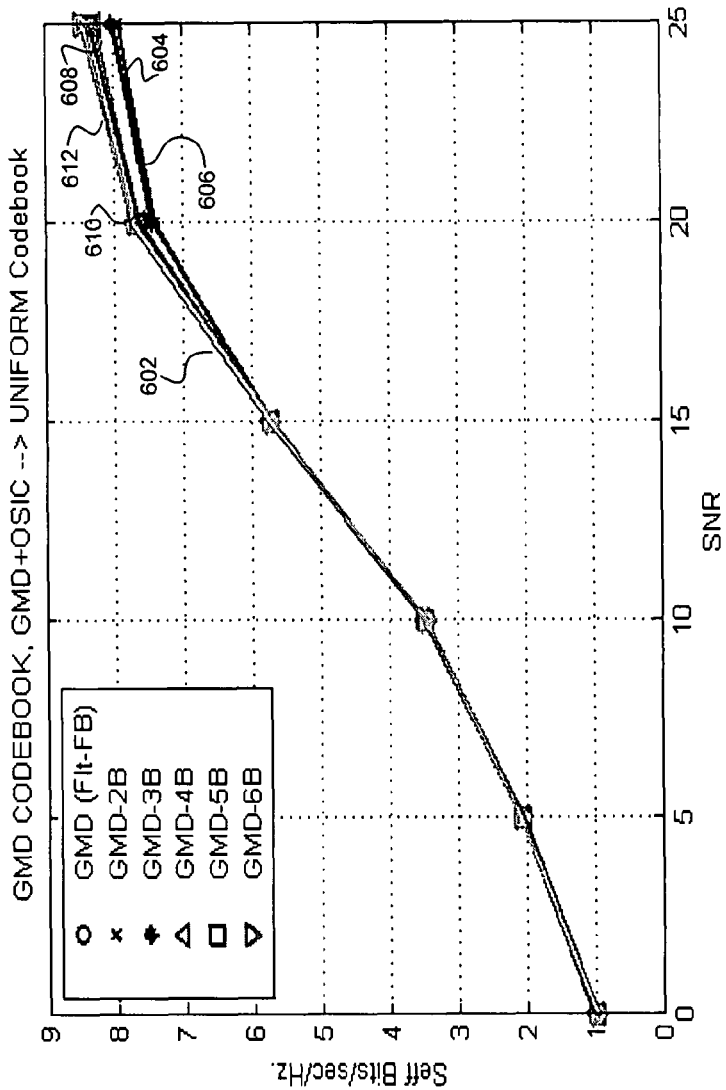
FIG. 6 is a performance plot of an exemplary 2×2 MIMO system with a GMD-OSIC receiver and finite-rate feedback, in accordance with an embodiment of the invention.

FIG. 6 is a performance plot of an exemplary 2×2 MIMO system with a GMD-OSIC receiver and finite-rate feedback, in accordance with an embodiment of the invention. Referring to FIG. 6, there is shown an SNR axis and a spectral efficiency axis (Seff). There is further shown a line plot for a Geometric Mean Decomposition with full feedback (GMD Flt-FB) 602, a line plot for GMD with 2 bits of feedback (GMD-2B) 604, a line plot for GMD-3B 606, a line plot for GMD-4B 608, a line plot for GMD-5B 610 and a line plot for GMD-6B 612.

The performance plot shown in FIG. 6 may utilize an Ordered Successive Interference Cancellation (OSIC) receiver. Instead of an SVD, a GMD may be used as explained for FIG. 1B. It may be seen from FIG. 6 that the performance obtained using an embodiment of the invention with a few bits of feedback, for example GMD-2B 604, GMD-3B 606, GMD-4B 608, GMD-5B 610, and GMD-6B 612, may be close to the performance obtained in a system with full feedback, represented by the line plot GMD Flt-FB 602.

In accordance with an embodiment of the invention, a method and system for codebook design of MIMO pre-coders with finite rate channel state information feedback may comprise: quantizing, in the channel quantization block 310, channel state information in a MIMO pre-coding system 200 and 300 onto a codebook, which comprises one or more unitary matrices, using a cost function, and iteratively updating the codebook, in codebook processing block 318, based on at least the channel state information. The channel state information, obtained in the channel estimation block 322, may comprise a matrix V that may be generated in the channel decomposition block 312. The cost function f(A) is defined by the following relationship:

$$f(A) = \left( \frac{1}{N} \sum_{j=1}^{N} |a_{jj}|^2 \right)$$

where A is a matrix of size N by N and $a_{ij}$ is element (i,j) of matrix A. Voronoi regions may be generated from the codebook for the unitary matrices in the codebook processing block 318. Further, in codebook processing block 318, a set of matrices based on the Voronoi regions and the unitary matrices may be generated. Updating the codebook may be achieved by modifying the set of matrices into a new set of unitary matrices, where the new set of unitary matrices become the codebook. An index of an element of the codebook onto which the channel state information is quantized, in channel quantization block 310, may be transmitted from a receiver to a transmitter in the MIMO pre-coding system, via feedback channel 320. The MIMO pre-coding system 200/300 may comprise one or more transmit and receive antennas. The matrix V may be generated using Singular Value Decomposition (SVD) or Geometric Mean Decomposition (GMD) in the channel decomposition block 312. One of the unitary matrices may be used to linearly transform a vector signal at a transmitter of the MIMO pre-coding system, in the transmit pre-coding block 314.

Another embodiment of the invention may provide a machine-readable storage, having stored thereon, a computer program having at least one code section executable by a machine, thereby causing the machine to perform the steps as described above for a method and system for codebook design of MIMO pre-coders with finite rate channel state information feedback.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   quantizing channel state information in a multiple-input multiple-output (MIMO) pre-coding system onto a codebook, which comprises one or more unitary matrices, using a cost function; and
   iteratively updating said codebook based on at least said channel state information.

2. The method according to claim 1, wherein said channel state information is a matrix V.

3. The method according to claim 2, comprising generating said matrix V using Singular Value Decomposition (SVD).

4. The method according to claim 2, comprising generating said matrix V using Geometric Mean Decomposition (GMD).

5. The method according to claim 1, wherein said cost function f(A) is defined by the following relationship:

$$f(A) = \left( \frac{1}{N} \sum_{j=1}^{N} |a_{jj}|^2 \right)$$

where A is a matrix of size N by N and $a_{ij}$ is element (i,j) of matrix A.

6. The method according to claim 1, comprising generating Voronoi regions from said codebook for said one or more unitary matrices.

7. The method according to claim 6, comprising generating a set of matrices based on said Voronoi regions and said unitary matrices.

8. The method according to claim 7, comprising updating said codebook by modifying said set of matrices into a new set of unitary matrices, where said new set of unitary matrices become said codebook.

9. The method according to claim 1, comprising transmitting an index of an element of said codebook onto which said channel state information is quantized, from a receiver to a transmitter in said MIMO pre-coding system.

10. The method according to claim 1, wherein said MIMO pre-coding system comprises one or more transmit antennas and one or more receive antennas.

11. The method according to claim 1, comprising linearly transforming with one of said unitary matrices, a vector signal at a transmitter of said MIMO pre-coding system.

12. A system for processing communication signals, the system comprising:
   a MIMO pre-coding system comprising one or more circuits, which enable:
   quantization of channel state information onto a codebook, which comprises one or more unitary matrices, using a cost function; and
   iterative updates to said codebook based on at least said channel state information.

13. The system according to claim 12, wherein said channel state information is a matrix V.

14. The system according to claim 13, wherein said one or more circuits generate said matrix V using Singular Value Decomposition (SVD).

15. The system according to claim 13, wherein said one or more circuits generate said matrix V using Geometric Mean Decomposition (GMD).

16. The system according to claim 12, wherein said cost function f(A) is defined by the following relationship:

$$f(A) = \left(\frac{1}{N}\sum_{j=1}^{N} |a_{jj}|^2\right)$$

where A is a matrix of size N by N and $a_{ij}$ is element (i,j) of matrix A.

17. The system according to claim 12, wherein said one or more circuits generate Voronoi regions from said codebook for said one or more unitary matrices.

18. The system according to claim 17, wherein said one or more circuits generate a set of matrices based on said Voronoi regions and said unitary matrices.

19. The system according to claim 18, wherein said one or more circuits update said codebook by modifying said set of matrices into a new set of unitary matrices, where said new set of unitary matrices become said codebook.

20. The system according to claim 12, wherein said one or more circuits transmit an index of an element of said codebook onto which said channel state information is quantized, from a receiver to a transmitter in said MIMO pre-coding system.

21. The system according to claim 12, wherein said MIMO pre-coding system comprises one or more transmit antennas and one or more receive antennas.

22. The system according to claim 12, wherein said one or more circuits linearly transform with one of said unitary matrices, a vector signal at a transmitter of said MIMO pre-coding system.

* * * * *